July 13, 1926.　　　　　　　　　　　　　　　　　1,592,039
C. S. MINER
TREATMENT OF SEEDS AND THE LIKE WITH FURFURAL
Filed July 5, 1923　　　2 Sheets-Sheet 1
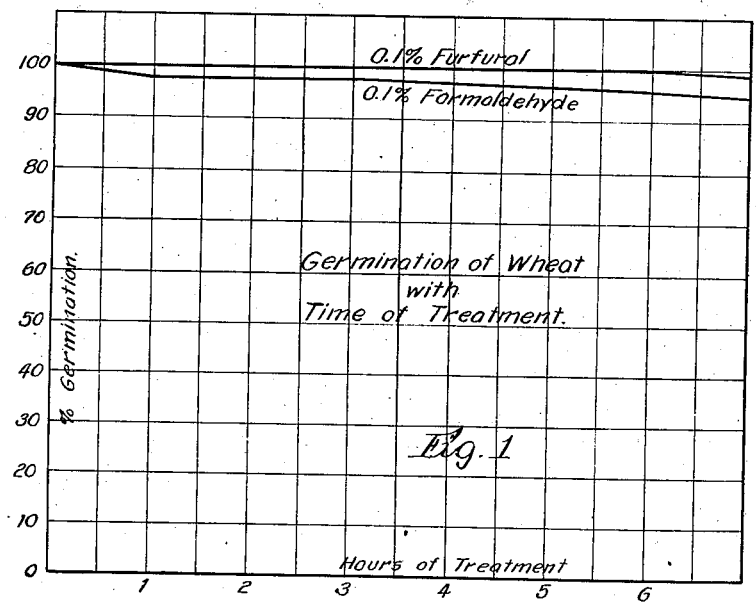
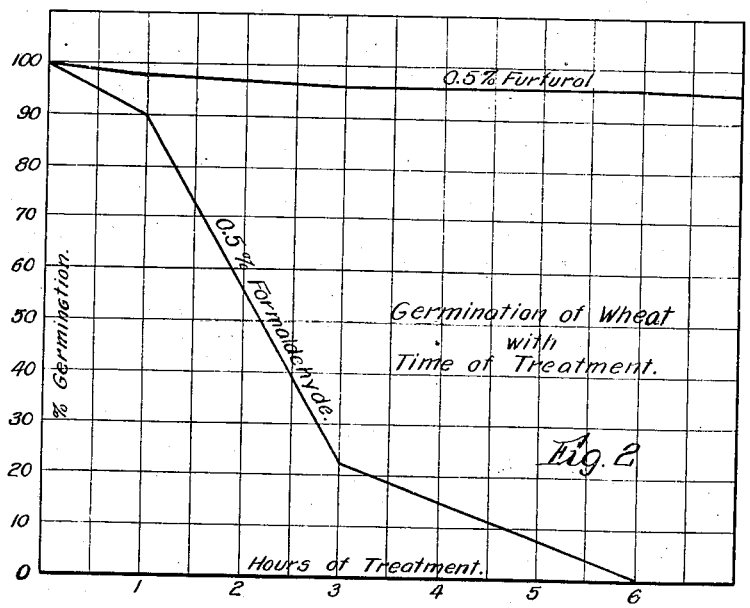
Witness:
P. J. Haselton
Inventor:
Carl S. Miner.
By: Jones, Addington, Ames, & Seibold
Attys.

July 13, 1926.
C. S. MINER
1,592,039
TREATMENT OF SEEDS AND THE LIKE WITH FURFURAL
Filed July 5, 1923    2 Sheets-Sheet 2
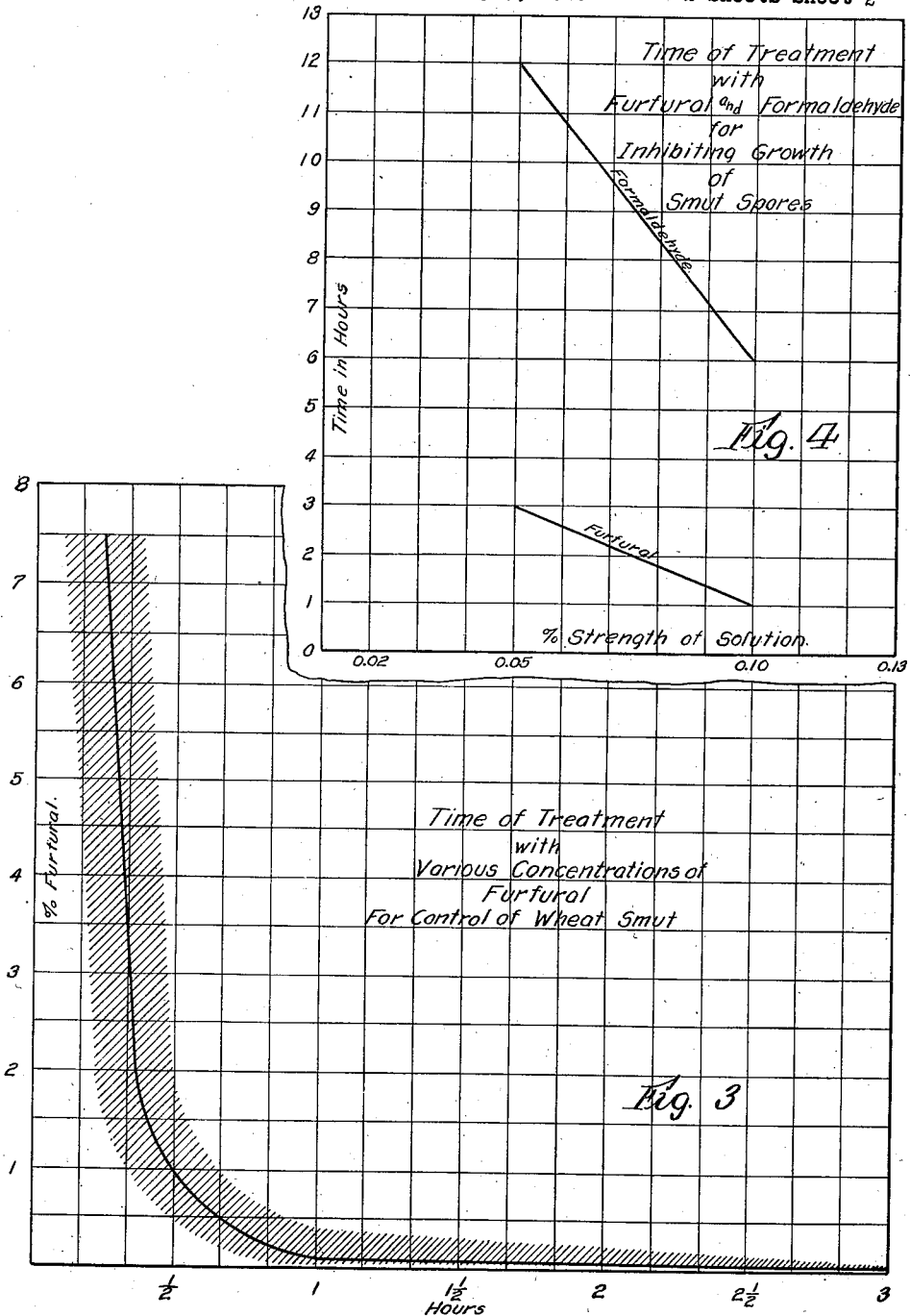

Patented July 13, 1926.

1,592,039

UNITED STATES PATENT OFFICE.

CARL S. MINER, OF CHICAGO, ILLINOIS, ASSIGNOR TO THE QUAKER OATS COMPANY, OF CHICAGO, ILLINOIS, A CORPORATION OF NEW JERSEY.

TREATMENT OF SEEDS AND THE LIKE WITH FURFURAL.

Application filed July 5, 1923. Serial No. 649,589.

My invention relates to fungicides and also to an improved process whereby fungous diseases upon plants or other vegetable or animal matter may be controlled.

One of the most serious problems in connection with agriculture is the control of fungous diseases of plants. Cereals, fruits and truck crops are all subject to such conditions and the losses therefrom often amount to a considerable portion of the entire value of the crops. Efforts to control these fungi as now practiced and in connection with which the herein disclosed fungicide may be used, include the application of fungicide to:

(1) Propagating material.
(2) The soil.
(3) The growing plants.

The fungicides commonly applied to the propagating material and soil are usually of a volatile nature, as formaldehyde dissolved in water.

The ideal fungicide should have a maximum killing power for fungi with a minimum toxicity for seeds and plants. It should be easy to use, and without offensive odor or deleterious effect on human beings. It should be stable so that it can be transported or stored without deterioration, and it should be cheap since its cost must bear a reasonable relation to the saving of crops effected by its use.

An object of my invention, therefore, is to provide an improved fungicidal agent which will possess to a large degree the aforementioned properties of the ideal fungicide.

Another object of my invention is to provied a process for controlling or inhibiting the growth of fungi upon living vegetable matter and the propagating material thereof.

Furthermore, the objects of my invention include the provision of a funngicide which possesses no disagreeable odor, is free from deleterious effects on skins and the mucous membranes of the user, is substantially non-toxic to the material treated, is non-volatile, and which is at the same time economical of production and convenient in use.

For applications to the soil and propagating material of agricultural products, formaldehyde is a common and typical fungicide. It has, however, many well known disadvantages but since formaldehyde is one of the most widely used fungicides at the present time, any proposed substitute therefor must rate above it in some or all of the characteristics listed, sufficiently to justify the substitution.

I have discovered in furfural a fungicide which has even greater fungicidal powers than formaldehyde and is free from its undesirable characteristics. Furfural is a liquid having an odor similar to that of oil of bitter almonds, and has a high boiling point (and consequently slow rate of volatilization). It is not injurious or irritating to the skin or mucous membranes and its low cost renders its use economical under circumstances when it would not be feasible to use formaldehyde.

In the accompanying drawings, Fig. 1 graphically illustrates the relative toxicity to seed wheat of 0.1% of furfural and 0.1% of formaldehyde. Fig. 2 is similar to Fig. 1 but serves to show the relative effects of 0.5% of furfural and 0.5% of formaldehyde. Fig. 3 serves to graphically illustrate approximately the desirable concentrations of furfural to be applied to the seed for various periods of time for the control of wheat smut, and Fig. 4 graphically shows the relative times required by formaldehyde and furfural respectively for inhibiting the growth of smut spores.

Before undertaking my extensive experiments with furfural, it did not seem in the least probable that furfural would prove an acceptable substitute for formaldehyde as a fungicide since the bactericidal power of furfural appeared to be substantially no greater than that of formaldehyde. As the bactericidal and fungicidal power of the same compound are frequently of the same general order of magnitude, it seemed improbable that the fungicidal power of furfural would be superior to that of formaldehyde. However, after continuing my experiments, I have made the unexpected discovery that not only is the fungicidal power of furfural not inferior to formaldehyde but that it is actually very greatly superior.

One of my experiments consisted in preserving animal matter in solutions of furfural and formaldehyde. One of the objections to the use of formaldehyde for this purpose is that even in high concentrations (10–15%) it does not prevent the growth of the mold penicillium, one of the commonest fungi, yet I have found that even as little as 0.5% of furfural was sufficient to entirely prevent the growth of mold even under conditions otherwise most favorable for its growth. In all other respects the use of furfural in this field has also proven to be highly satisfactory.

I have further discovered that the use of furfural is very effective in inhibiting the growth of wheat smut. (Tilletia foetens, bunt, stinking smut of wheat). I have found for example, that this fungus is killed when the wheat is soaked for three hours in a .05% solution of furfural, whereas with a formaldehyde solution of the same strength, a period of twelve hours soaking is necessary in order to destroy the smut. When an 0.1% solution of furfural is used, an hour's soaking is effective, whereas with formaldehyde of 0.1% strength, six hours' soaking is necessary, as appears from Fig. 4. Accordingly it will be seen that for this purpose formaldehyde requires a period of treatment twice to four times as great as does furfural From my experiments to determine the effect of these two fungicides on the germinating power of the treated seed, another unexpected discovery has resulted, namely that while furfural is more toxic for fungi than is formaldehyde, it is much less toxic for the wheat germ. Wheat may be soaked for a period of six hours or more in an 0.1% solution of furfural with little or no effect upon the germination of the seed wheat, whereas with formaldehyde an 0.1% solution during six hours' treatment will prevent germination of approximately 5% of the seed wheat, as is shown in Fig. 1. Wheat can be soaked for six hours in an 0.5% solution of furfural with a reduction of only 4% in the germinating power of the seed, whereas six hours' soaking of wheat in 0.5% of formaldehyde completely destroys its germinating power, as is shown in Fig. 2.

To summarize its superior advantages as compared with the present somewhat standardized fungicides, furfural has a vastly greater fungicidal power and is substantially less toxic for seed than is formaldehyde. Furthermore, furfural is free from the irritating odor and deleterious effect on skins and mucous membranes which make the use of former fungicides such as formaldehyde so objectionable from the standpoint of the operator.

Also furfural is more stable than formaldehyde. It is a liquid whereas formaldehyde is a gas merely dissolved in water (40% solution) and therefore readily escapes into the air if the solution is not kept in tightly closed containers. Furfural can be transported more economically than formaldehyde and most other fungicides since it is available commercially in practically pure form (95% strength) where "formalin" the commercial solution of formaldehyde contains 60% of water thus involving additional freight and packing costs. Furfural is cheaper than formaldehyde being at present quoted at two-thirds the price of formaldehyde.

In practicing my process the material or hosts to be treated may be washed, sprayed or soaked with a solution of which the chief ingredient is furfural. In case the fungicide is applied to propagating materials, such as the seed of onions, wheat, corn and the like, this material may be first soaked in a bath comprising furfural, then rinsed and allowed to drain and to dry, thus leaving the seed in a condition entirely free from fungous diseases.

The heavy line curve in Fig. 3 serves to graphically illustrate the approximate concentrations of furfural to be applied to the seed for various periods of time for the control of wheat smut without impairing the germination of the wheat. Of course, these values can not be exactly predetermined for all possible diseases. However, satisfactory results may be obtained by using concentrations that fall within the shaded area accompanying the curve in Fig. 3.

For example, seed wheat may be treated by soaking in a solution containing .05% to 0.1% (from 1 to 2 parts of furfural per 2000 parts of water) for from 1 to 3 hours, the seed then being drained, rinsed and spread for drying. Seed thus treated will be entirely free from living spores of fungi and will have suffered no loss of viability. An alternative method for carrying out my process may be to soak the seed for a period of five minutes in approximately a 7% solution of furfural, then allowing the seed after being washed to drain and dry, or if the seed is to be immediately planted the drying may not be necessary.

It will be apparent from the foregoing that furfural is a very desirable fungicide for treating many materials not specifically mentioned herein and while I have described an embodiment of my invention, it is to be understood that I am to be limited only by the following claims forming a part of this present application.

While I have thus described my invention, what I claim as new and desire to secure by Letters Patent in the United States, is:

1. The process of inhibiting fungous growths which comprises applying to the host a solution comprising furfural as an active ingredient.

2. The process of controlling fungous growths which comprises immersing the propagating material of the host in a bath comprising furfural as an active ingredient.

3. The process of controlling fungous growths which comprises first immersing the propagating material of the host in a solution comprising furfural as an active ingredient, then draining off the solution, and finally drying the material.

4. The process of controlling fungous growths which comprises treating the host with solutions comprising furfural of concentrations non-toxic to the host and bearing substantially a predetermined relation to the length of the time of treatment such that the growth of fungi is inhibited.

In witness whereof, I have hereunto subscribed my name.

CARL S. MINER.